No. 634,595. Patented Oct. 10, 1899.
W. H. THOMPSON.
MECHANICAL JOINT.
(Application filed May 22, 1899.)
(No Model.)
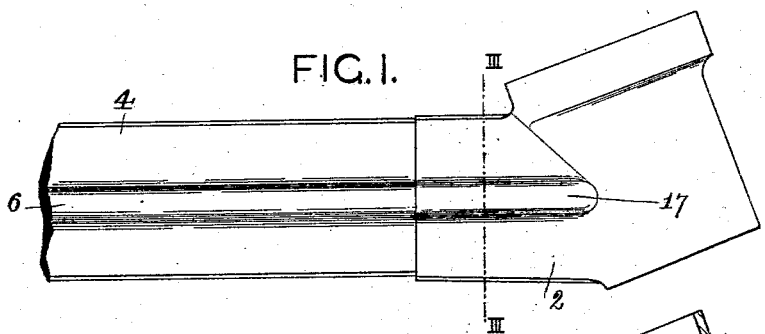
FIG. I.
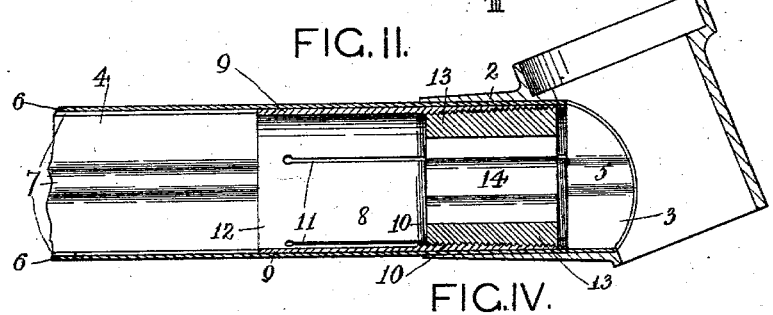
FIG. II.
FIG. IV.
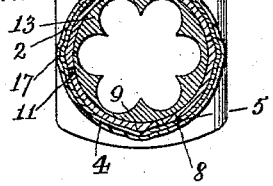
FIG. III.
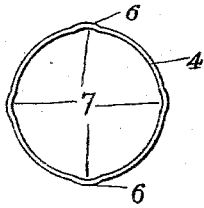
FIG. V.
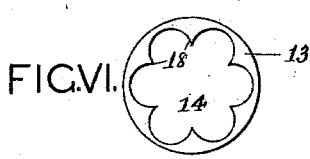
FIG. VI.
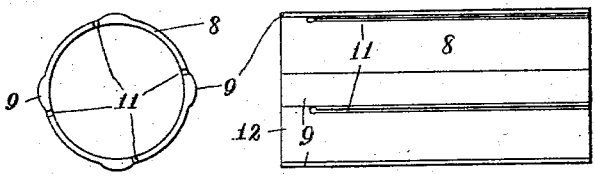
FIG. VII.  FIG. VIII.
Witnesses,
Thomas Fletcher Wilson,
John J. Fazakarley.
Inventor,
William Havelock Thompson,
per
Douglas Leechman
Attorney.
THE NORRIS PETERS CO., PHOTO-LITHO., WASHINGTON, D. C.

UNITED STATES PATENT OFFICE.

WILLIAM HAVELOCK THOMPSON, OF GATESHEAD, ENGLAND.

MECHANICAL JOINT.

SPECIFICATION forming part of Letters Patent No. 634,595, dated October 10, 1899.

Application filed May 22, 1899. Serial No. 717,807. (No model.)

*To all whom it may concern:*

Be it known that I, WILLIAM HAVELOCK THOMPSON, a subject of the Queen of Great Britain, residing at Gateshead-upon-Tyne, in the county of Durham, England, have invented certain new and useful Improvements in Mechanical Joints, of which the following is a specification.

My invention relates to mechanical joints for connecting the parts of tubular structures, such as velocipede-frames, and has for its object to provide a joint in which the member and lug shall be incapable of material relative rotation during the process of connection and which shall be completed without the employment of heat, as in brazing. I attain these objects by constructing the joint in the manner illustrated in the accompanying drawings, wherein—

Figure I is a side elevation of a joint, showing, by way of example, the top tube of a velocipede-frame connected to the upper lug of the steering-head. Fig. II is a central vertical section through the joint. Fig. III is a transverse section on the line III III in Fig. I. Figs. IV, V, VI, and VII are end elevations of the lug, tube, plug, and liner, respectively. Fig. VIII is a side elevation of the liner.

The same numerals refer to the same parts throughout the drawings.

In constructing a joint according to my invention I employ a lug 2 of usual form and bore the same with a preferably conical hole 3, enlarging slightly inwardly, which hole is made a fairly-close fit for the end of the tube 4 to be secured therein. I make a number of slight longitudinal grooves 5 in the lug and provide the tube end with corresponding ribs 6. These ribs may be pressed or drawn on the tube or may be otherwise formed thereon, so as to produce corresponding channels 7 in the interior thereof. The ribs may be confined to the ends of the tube or may extend along the whole or a shorter part or parts thereof.

A liner 8, preferably of somewhat greater length than the hole 3 in the lug 2, is fitted into the end of the tube 4. This liner is provided on the exterior with ribs 9, adapted to engage in the channels 7 in the tube end. It is tapped internally with a fine thread 10 for a distance corresponding to the length of the hole 3 and is split longitudinally with, say, four equidistant cuts 11, extending along and some distance beyond its tapped portion 10. The said tapped portion of the liner is made slightly taper internally, contracting toward the complete end 12. The cuts 11 are preferably made near to the left sides of the respective ribs 9 to prevent displacement of the parts of the liner when putting the joint together. The liner 8 is inserted in the end of the tube with its complete part 12 farthest from the mouth of the tube.

The end of the tube 4 is adapted to be expanded within the lug 2 by a slightly taper hollow plug 13, which screws into and expands the liner 8. This plug is screw-threaded and tapered externally to correspond to the interior of the liner, but is of slightly larger average external diameter than the average internal diameter of the said liner. The bore 14 of the plug is made of other than circular transverse section, so that the said plug may be rotated by a tool of suitable form thrust thereinto. A suitable form for the bore of the plug may be obtained by drilling a series of equidistant holes lengthwise through the plug, the effect of the drilling being to cut away the axial portion of the plug and leave a series of internal parallel ribs 18, as shown. These ribs materially assist the plug in resisting radial crushing strains and afford a hold for the rotating tool. The lug is preferably provided with external ribs, such as 17, to compensate for the weakening effect of the grooves 5.

To construct the joint, the liner 8 is fitted into the end of the tube 4, with the ribs 9 engaging in the channels 7, and the plug 13 is screwed into the liner as far as may be without interfering with the entering of the tube end into the lug, the grooves 5 in which lug receive the ribs 6 on the tube. The end of the tube carrying the liner and plug is then thrust into the hole 3 in the lug. Finally the plug 13 is screwed well into the liner 8, and the tapering of these two parts causes the expansion of the split part of the liner, which in turn causes the expansion of the tube end 4 and the jamming thereof within the lug 2.

The engagement of the ribs 6 and 9 with the grooves and channels 5 and 7, respectively, forms an important part of my invention, as unless rotary movement of the tube 4 and liner 8 relatively to the lug 2 be prevented the parts are very liable to get out of position as soon as any considerable force is exerted in screwing in the plug, and such displacement would prevent the proper construction of the joint. The part 12 of the liner extending beyond the lug acts as a reinforcement. Any suitable means may be employed for screwing in the plugs, those means being preferred which do not involve the drilling of large additional holes in the lugs or other parts of the frame. By these means the end of the tube 4 (which may be split or entire) is gripped between the liner 8 and the lug 2 and is firmly secured to the said lug.

The invention may be applied to structures in which the tubes may be made of steel, aluminium, or other suitable ductile metal or material. Similarly any suitable material may be employed for the lug, liner, and plug.

What I claim as my invention, and desire to secure by Letters Patent, is—

1. In a mechanical joint, the combination with the lug and the tubular member to be secured thereto, of a hole in the said lug, longitudinal grooves in the said hole, ribs on the tube end adapted to engage in the grooves in the lug, longitudinal channels in the tube end, a liner, ribs on the said liner adapted to engage in the channels in the tube end, a screw-thread and longitudinal slots in the said liner, a taper plug and a screw-thread on such plug adapted to engage in the screw-thread in the said liner, substantially as set forth.

2. In a mechanical joint, the combination with the lug and the tubular member to be secured thereto, of a hole in the said lug, longitudinal grooves in the said hole, ribs on the tube end adapted to engage in the grooves in the lug, longitudinal channels in the tube end, a liner, ribs on the said liner adapted to engage in the channels in the tube end, a screw-thread and longitudinal slots in the said liner, a taper plug, a screw-thread on such plug adapted to engage in the screw-thread in the said liner and a non-circular bore to the plug adapted to receive a tool whereby the said plug may be rotated, substantially as set forth.

WILLIAM HAVELOCK THOMPSON.

Witnesses:
J. A. DIXON,
THOS. HENDERSON.